US012559591B2

(12) United States Patent
Li

(10) Patent No.: US 12,559,591 B2
(45) Date of Patent: Feb. 24, 2026

(54) CONTINUOUS POLYMERIZATION METHOD FOR NYLON

(71) Applicant: CHENGDU 401 TECHNOLOGY CO., LTD., Sichuan (CN)

(72) Inventor: Yang Li, Shanghai (CN)

(73) Assignee: CHENGDU 401 TECHNOLOGY CO., LTD., Sichuan (CN)

(*) Notice: Subject to any disclaimer, the term of this patent is extended or adjusted under 35 U.S.C. 154(b) by 659 days.

(21) Appl. No.: 17/952,946

(22) Filed: Sep. 26, 2022

(65) Prior Publication Data

US 2023/0016115 A1     Jan. 19, 2023

Related U.S. Application Data

(63) Continuation of application No. PCT/CN2021/083172, filed on Mar. 26, 2021.

(30) Foreign Application Priority Data

Mar. 28, 2020     (CN) .......................... 202010232543.1

(51) Int. Cl.
| | |
|---|---|
| C08G 69/26 | (2006.01) |
| C08G 69/28 | (2006.01) |
| C08L 77/00 | (2006.01) |

(52) U.S. Cl.
CPC .............. C08G 69/28 (2013.01); C08L 77/00 (2013.01); *C08J 2377/00* (2013.01)

(58) Field of Classification Search
CPC ....... C08L 77/00; C08G 69/26; C08J 2377/00
See application file for complete search history.

(56) References Cited

U.S. PATENT DOCUMENTS

2019/0270885 A1     9/2019 Kato

FOREIGN PATENT DOCUMENTS

| | | | |
|---|---|---|---|
| AU | 1532670 | A | 11/1971 |
| CN | 101284906 | A | 10/2008 |
| CN | 101679626 | A | 3/2010 |
| CN | 105330848 | A | 2/2016 |
| CN | 105829298 | A | 8/2016 |
| CN | 108047444 | A | 5/2018 |
| CN | 109180931 | A | 1/2019 |
| CN | 109354863 | A | 2/2019 |
| CN | 111363144 | A | 7/2020 |
| CN | 111518270 | A | 8/2020 |
| CN | 112062950 | A | 12/2020 |
| CN | 112390945 | A | 2/2021 |
| CZ | 20004402 | * | 5/2001 |
| EP | 0 413 71 | A2 | 12/1981 |
| JP | H06-256503 | A | 9/1994 |
| JP | 2017-519082 | A | 7/2017 |
| JP | 6363565 | B2 | 7/2018 |
| SG | 180968 | A1 | 6/2012 |

OTHER PUBLICATIONS

Office Action issued in connection with Japanese Appl. No. 2022-551779 dated Aug. 22, 2023.
Extended European Search Report issued in connection with EP Appl. No. 21779786.9 dated Mar. 19, 2024.

* cited by examiner

*Primary Examiner* — Gregory Listvoyb
(74) *Attorney, Agent, or Firm* — Foley & Lardner LLP

(57)     ABSTRACT

A continuous polymerization method for nylon. Polymerization starting materials comprise, in parts by mass, 5-60 parts of polymerization monomer dibasic acid and/or dibasic acid ester, 3-50 parts of diamine, and 10-90 parts of reactive dispersion medium polyamide. Polymerization steps comprise: continuously adding the polymerization starting materials into a material mixing device in proportion, so that the raw materials are mixed and reacted in the material mixing device to form a continuously conveyed melt, and reacting the evenly dispersed melt in a subsequent polymerization device until nylon is polymerized to reach a required molecular weight. The method is an efficient and environment-friendly polymerization method for nylon.

12 Claims, No Drawings

CONTINUOUS POLYMERIZATION METHOD FOR NYLON

CROSS-REFERENCE TO RELATED PATENT APPLICATIONS

The present application is a Continuation of International Application No. PCT/CN2021/083172, filed Mar. 26, 2021, which claims priority to CN 202010232543.1, filed Mar. 28, 2020. The entire disclosures of each of the aforementioned applications are incorporated herein by reference.

TECHNICAL FIELD

The present invention relates to the technical field of engineering plastics, and in particular, to a continuous polymerization method for nylon.

BACKGROUND

Nylon is widely used in various fields such as electronic and electrical, machinery, fibers, and automobiles due to comprehensive advantages thereof in mechanical properties, durability, corrosion resistance, heat resistance, and other properties and costs. Due to the pursuit of light weight and environmental protection in various industries, plastic instead of steel and plastic instead of wood have become major trends in the selection of materials for design. As one of the fastest growing parts of the plastics industry today, the improvement of production processes has been a hot topic of research.

At present, the most commonly used polymerization methods for nylon comprise a nylon salt process and a melt polymerization process. The nylon salt process generally begins with the preparation of nylon salts in water or a strong polar organic solvent, followed by melt polycondensation at a certain temperature to obtain the final polyamide. For example, in the patent CN109180931A published in 2018, polyamide 1313 was still prepared by salifying in an aqueous solution first and then performing melt polycondensation. At an initial stage of melt polycondensation, a large amount of water may be added as a dispersant to ensure quality stability of a final product. However, this nylon salt process has the following problems.

1) A step of preparing the nylon salt in a reaction vessel is needed, which is complicated in process, and is difficult to achieve continuous production.

2) A large amount of water needs to be consumed as a disperse system, which causes waste.

3) The added water may be evaporated after vaporization during the polycondensation process, which may consume a lot of energy.

Although water does not need to be added as a solvent in the melt polymerization process, there are still the following problems.

1) The melt polymerization is usually carried out in a reaction vessel, and is difficult to achieve continuous production.

2) Diamine needs to be added in a molten state of a dibasic acid in the melt polymerization, the dibasic acid needs to be melted first in the process, and then a polymerization reaction is carried out, so that the reaction efficiency is low.

3) In order to avoid a large amount of losses of diamine with a lower boiling point caused by intense heat release during binding of the diamine and the dibasic acid, diamine with a higher boiling point is usually used.

4) In order to avoid a large amount of concentrated heat release during binding of the dibasic acid and the diamine in feeding, which leads to decomposition due to high temperature, it is necessary to slowly add the diamine, and this addition may take several hours, which greatly limits the production efficiency of the nylon produced by the melt polymerization process.

SUMMARY

An exemplary embodiment relates to a continuous polymerization method for nylon, wherein polymerization starting materials comprise, in parts by mass, 5-60 parts of polymerization monomer dibasic acid and/or dibasic acid ester, 3-50 parts of diamine, and 10-90 parts of reactive dispersion medium polyamide; and polymerization steps comprise: continuously adding the polymerization starting materials into a material mixing device in proportion, so that the starting materials are mixed and reacted in the material mixing device to form a melt that is continuously conveyed, and reacting the evenly dispersed melt in a subsequent polymerization device until nylon is polymerized to reach a required molecular weight.

DETAILED DESCRIPTION

In response to the technical problems of large energy consumption and low melt polymerization efficiency in the existing nylon salt process, the present invention provides a continuous polymerization method for nylon, i.e., adding a certain amount of polyamide resin as a reactive dispersion medium in a starting material system, so that each component can be evenly and stably dispersed in the dispersion medium, thus ensuring the uniformity of a subsequent polymerization reaction. By making the mixing process of the materials in a continuous flow state to avoid concentrated heat release of the materials in the same position, the heat release in the material mixing process is controllable, and no local high temperature is generated, thus solving the bottleneck of mixing materials during melt polymerization production. The method of the present invention is an efficient and environment-friendly polymerization method for nylon.

In order to achieve the above objects of the present invention, the following technical solution is employed in the present invention.

A continuous polymerization method for nylon, wherein polymerization starting materials comprise, in parts by mass, 5-60 parts of polymerization monomer dibasic acid and/or dibasic acid ester, 3-50 parts of diamine, and 10-90 parts of reactive dispersion medium polyamide; and polymerization steps comprise: continuously adding the polymerization starting materials into a material mixing device in proportion, so that the starting materials are mixed and reacted in the material mixing device to form a melt that is continuously conveyed, and reacting the evenly dispersed melt in a subsequent polymerization device until nylon is polymerized to reach a required molecular weight.

According to the technical solution of the present invention, polyamide resin is added into the starting materials as a reactive disperse system, which reduces a heat release amount of reactants in the unit weight on one hand, and makes the disperse system have a certain melting point and viscosity adaptable to the application of a continuous flow material mixing device on the other hand. The solution of the present invention allows the materials to be added in a continuous state and the mixing process and the continuous conveying process to be synchronized, thus allowing the heat release process to be dispersed to different parts of the whole set of devices with the continuous forward conveying of the materials. Because the raw materials according to the solution of the present invention contain a polymer, the materials have a certain viscosity after being mixed evenly, which solves the problems that traditional small molecule monomer starting materials with low viscosity cannot withstand a vapor pressure generated by the small molecules removed at high temperature after a polycondensation reaction occurs, therefore, traditional small molecule monomer starting materials with low viscosity cannot be fed continuously, and the melt polymerization can only concentrate on feeding and heat release, which reduces the feeding efficiency.

Because the polymerization of amide is a reversible reaction, a certain amount of polyamide resin is added into the raw materials according to the present invention, and the molten polyamide resin as a reactive disperse system can evenly and stably disperse dibasic acid and/or dibasic acid ester and diamine in the system, thus avoiding the addition of a large amount of water or small molecule organic solvent, and omitting a step of preparing nylon salt in aqueous solution or small molecule organic solvent. As a reactive disperse system, the polyamide also participates in the reaction as a starting material, remains in a final product, becomes a part of the product polyamide, and determines performances of the final product together with the polymerization monomers. The polyamide starting material finally becomes a part of the product, so the steps of solvent removal and solvent treatment in the use of small molecule solvents are omitted, which makes the process more environmentally friendly.

The addition of polyamide allows the melt mixing process to be achieved very easily and continuously in the continuous flow mixing device. The boiling point of the system is lower than that of the dibasic acid, and a more volatile dibasic acid ester may also replace all or part of the dibasic acid as the starting material, and a reaction rate of the dibasic acid ester is faster than that of the dibasic acid. In this case, the small molecules removed by the polycondensation may contain alcohol. Alcohol is a molecule easier to remove in comparison to water, making the polymerization reaction easier to carry out, and then the alcohol may be collected and treated later.

The temperature of the material mixing process can satisfy the melting of the polyamide starting material. Small molecules in the system, such as polymerized monomers, may plasticize the polyamide starting material, which may probably lower the melting temperature of the polyamide. However, the temperature of the system must ensure that the polyamide can be melt and play the role of the reactive dispersion medium. As the polymerization monomer can react with the polyamide starting material at a high temperature, the dispersion medium of the present invention is not limited to the polyamide starting material in a molten state, but may also be a melt formed after the polyamide starting material reacts with the polymerization monomer.

Various continuous flow material mixing devices may be used in the material mixing step of the present invention, preferably at least one of a screw extruder, a continuous banburying device and a tubular reactor.

The screw extruder, the continuous banburying device, and the tubular reactor have good sealing performances and pressure resistance due to small diameters thereof, which can ensure that even if the temperature in the system exceeds the boiling point of the diamine raw material, the raw materials can still be sealed and mixed well and there is almost no loss of diamine. In addition, the screw extruder and the continuous banburying device are both mixing units equipped with rotors and barrels with strong dispersion effect, which have outstanding heat release efficiency and can quickly disperse heat generated by binding the diamine with the dibasic acid without causing the local temperature in the system to get out of control to result in material decomposition and color darkening. In this way, all the starting materials may be added to the system more quickly and continuously, so the production efficiency is high.

Since the screw extruder and the continuous banburying device have better mixing efficiency and heat release efficiency than those of the tubular reactor, and the screw extruder is more convenient for adding liquid materials, a screw extruder, especially a screw extruding and mixing device with mixing effect and two or more screws is further preferred. The most commonly used screw extruder is a co-rotating twin-screw extruder with mixing effect, which achieves suitable mixing effect and matching conveying capacity by combining different screw elements. Other devices with similar screw conveying and mixing functions may all be applied to the present invention.

When a melting point of the dibasic acid and/or dibasic acid ester starting material is lower than that of the polyamide starting material, the material mixing device is the tubular reactor. When the melting point of the dibasic acid/dibasic acid ester starting material is higher than that of the polyamide raw material, the dibasic acid/dibasic acid ester raw material is difficult to melt, and it is better to mix the starting materials by using the screw extruder or the continuous banburying device with outstanding solid particle dispersion ability. The infusible aromatic dibasic acid with a high melting point may be dissolved in the polyamide disperse system, or fine particles may be dispersed in the molten polyamide after degradation, both of which can successfully polymerize with the diamine.

When the tubular reactor is used as the mixing device, in order to avoid that the polyamide starting material cannot be melt in time in the tubular reactor, the polymer may be melted first and then added into the tube, which is beneficial to improve the mixing efficiency. The tubular reactor is more suitable for a case where the melting point of the dibasic acid is lower than that of the polyamide raw material. In this case, when the dibasic acid is added into the molten polyamide starting material, the dibasic acid may be melt quickly to form a liquid, and even if the shear of the tubular mixing device is weak, the melted material can be completely dispersed.

The subsequent polymerization device of the present invention is at least one of a screw extruder, a tubular reactor and a reaction vessel. In order to achieve a sufficiently large molecular weight, a sufficient reaction time is needed, so that a screw extruder with an exceptionally large length-diameter ratio is needed, which is usually achieved by connecting multiple screw extruders in series, increasing fixed investments and an area occupied by the screw extruder(s). A volume of the whole set of devices may be reduced by connecting other polymerization device in series. A tubular reactor, a reaction vessel polymerization device and a screw mixing device with a larger diameter may be used in the present invention.

The subsequent polymerization device may be continuous flow reactors or screw extruders connected in sequence. The continuous flow reactor is a continuous polymerization reactor, which may be in the form of tube, reaction vessel or tower, mainly ensuring that the materials are flowing continuously in and out, ideally, there is no reflux and that all the materials have equal residence time in the reactor. The continuous flow reactor can control a polymerization time of the materials, so as to obtain polymers of different molecular weights. After the materials pass through the continuous flow reactor, a polymerization device in which the materials flow continuously out of the device is also preferred, which is the most beneficial to achieve continuous production.

Preferably, the polymerization process comprises devolatilization, extrusion and granulation by the screw extruder. In the polymerization process of the polyamide, small molecules are removed, and complete continuous production can be achieved through devolatilization by the screw extruder. After various starting materials are polymerized in the subsequent polymerization device, a screw extruder may be directly added after the subsequent polymerization device to continue polymerization and remove volatile small molecules, so as to further homogenize the materials.

According to the present invention, a feeding mode of various starting materials is very flexible, and a feeding section may be added at a handpiece at the same time, or part of the raw materials may be added in a middle section of the device through side feeding or liquid pumping, and even the same starting material can be added in batches at different positions, so that the materials are further mixed more evenly.

According to the present invention, the diamine is added into the material mixing device in a liquid state. The diamine may be melted into a liquid state or dissolved in a small molecule solvent, and added into the material mixing device in a liquid state. For the diamine with a higher melting point, the materials can be mixed by dispersing the dibasic acid or dibasic acid ester and the diamine into the molten polyamide respectively, and then mixing the melt to achieve the mixing of the materials, which makes it easier to ensure a sealing performance of the device and prevent losses of the volatile raw materials.

Preferably, the polymerization monomers are respectively dispersed into the molten polyamide to form melts first, and then the various melts are continuously added into the material mixing device and mixed evenly.

As the molten diamine and the dibasic acid directly meet to have a violent acid-base neutralization reaction, and the heat release of the reaction is difficult to control, and the local high temperature may also make the polymerization process difficult to control, it is not appropriate for the molten diamine and the dibasic acid to directly meet and react. The dibasic acid is the most commonly used initial starting material for preparing polyamide. Compared with the diamine, the dibasic acid has a higher melting point, which makes it more difficult to disperse, and also more difficult to volatilize. Especially, when the starting material contains an aromatic dibasic acid, it is more difficult to disperse. Adding the dibasic acid in advance may not affect the ratio of materials.

Preferably, the dibasic acid starting material and the molten polyamide starting material are mixed evenly for reaction first, and then the diamine is continuously added into the mixture and mixed evenly for reaction. The diamine is a molten liquid, or dissolved in a small molecule solvent.

The diamine and the dibasic acid or dibasic acid ester may react at high temperature to form salt or small molecule removal polymerization. The removed small molecules, such as water or alcohol, may form high-pressure gas at high temperature. Therefore, it is further preferred that a filling rate of at least one section in the device before the diamine is added is 100%, so that a section of the mixing device is filled with materials before the diamine is added, and a sealed section can be formed.

Further preferably, after the diamine is added, at least one section of the materials flows upwardly. After all the materials are mixed, it is preferable to set a section of upward flow for the materials under the action of a pump, so that the melt formed by the materials may form a sealed section when flowing upwardly even at a low viscosity, and an upper space of the device may not be filled due to the low viscosity to cause a large amount of gaseous diamine to overflow will not happen.

A molar ratio of the diamine to the dibasic acid and/or dibasic acid ester is 0.4-2.5:1. In order to obtain the final polymer with large enough molecular weight, it is necessary to ensure relative balance of a ratio of amino functional groups to carboxyl functional groups in the final polymerization system. In general, an addition of the diamine is slightly more than that of the dibasic acid as the diamine has stronger volatility. As for the polyamide starting material of the present invention, an amide oligomer with a low molecular weight may be used as the polyamide starting material, and a content ratio range of an amino group to a carboxyl group in the oligomer raw material may be large. Therefore, it is necessary to adjust a ratio of the acid starting material to the amine starting material in the oligomer starting material according to the ratio of the amino group to the carboxyl group in the oligomer raw material, so that the ratio of the acid to the amine in the final whole system is balanced to obtain a product with a high molecular weight. Therefore, in the present invention, the ratio of the acid to the amine in the three main starting materials may be adjusted as 0.4-2.5:1, so that sources of the starting materials in the present invention are more extensive, and very primary amide oligomers, even amide oligomers containing only one repeating unit, may also be used as the polyamide starting material. Terminal groups of these amide oligomers may be mainly amino groups, carboxyl groups, or amino groups and carboxyl groups in considerable proportion, or even primary polymers containing unpolymerized carboxylic acid or amine monomers. In this case, the ratio of the amine to the acid additionally added in the starting materials may be determined by measuring an amine value and an acid value of the oligomer. When the diamine or the dibasic acid in the whole system is excessive, various amino-terminated or carboxyl-terminated polyamides with different molecular weights may also be prepared by using the method of the present invention. The polyamide with a low molecular weight may be used as an important component in polyurethane and epoxy resin formulations.

The dibasic acid starting material of the present invention contains an aromatic dibasic acid, and a molar ratio of the aromatic dibasic acid accounts for at least 20% of the dibasic acid starting material, which is more advantageous than the traditional method.

The aromatic dibasic acid is a common polymerization monomer used in high-temperature resistant polyamide materials, but solubility and melting performances of the aromatic dibasic acid are far worse than those of an aliphatic dibasic acid due to a special molecular structure of the aromatic dibasic acid, so the preparation of nylon containing aromatic dibasic acid is also more difficult than that of aliphatic nylon. Since the method of the present invention makes full use of dispersion advantages of the polyamide as the disperse system and is able to take advantage of the high mixing efficiency of the screw extruder, the aromatic acid becomes very fine particles evenly distributed in the system even when a high percentage of aromatic dibasic acid cannot be completely dissolved in the polyamide. After the addition of the diamine, a completely uniform system can still be formed by the dispersion of a screw element, and as the aromatic dibasic acid gradually reacts, the remaining fine particles of the aromatic dibasic acid may continue to dissolve and disperse into the system. This can well solve a series of problems faced by the polymerization of the aromatic dibasic acid, is especially suitable for the preparation of semi-aromatic nylon containing aromatic dibasic acid, and particularly has outstanding advantages compared with other methods in preparing a product with a high proportion of aromatic starting materials.

According to the present invention, a maximum temperature of the materials in the polymerization process is not lower than 250° C., so that the starting materials can be better reacted and mixed in a molten state to improve the polymerization efficiency.

A melting point of the polyamide product according to the present invention is higher than 250° C. The production of the polyamide with high melting point needs higher temperature to ensure fluidity of the materials, but the high-temperature materials are easy to oxidize. Especially for a batch reactor, as inconsistent residence time of the materials at high temperature, it is easier for the materials with long residence time to oxidize, which affects the product performances. The continuous production process of the present invention is suitable for the production of polyamide with a melting point over 250° C. Especially, the process of the present invention has outstanding advantages in the production of high-temperature resistant polyamide with a melting point higher than 290° C. In this case, a molar ratio of the aromatic dibasic acid accounts for at least 20% of a molar ratio of the dibasic acid starting material.

A mass proportion of the polyamide according to the present invention in the polymerization starting materials is more than 10%.

The addition of the reactive disperse system polyamide is very important to achieve the mixing reaction of screw and tubular reactors, as the introduction of polyamide, and the use of the polyamide after melting as the reactive disperse system, ensure that the materials can be evenly mixed in the mixing device. Some aromatic dibasic acids used as starting materials for polymerization monomers may have a higher melting point than the temperature inside the mixing device, the powdered dibasic acids with high melting point can also be dispersed into the molten polyamide to form a uniform melt even if the powdered dibasic acids cannot be melted. In this case, some of the dibasic acids react with other starting materials and the melting point of the dibasic acids decreases, some of the dibasic acids can be dissolved inside the reactive disperse system, and some of the dibasic acids remain as fine powder evenly dispersed into the melt, which does not cause uneven mixing of the reaction materials.

In addition, the temperature in the mixing device may be higher than the boiling point of some diamine starting materials, and once the diamine and the dibasic acid meet to generate a polymerization reaction, small molecules may be removed. The diamine starting material above the boiling point and the removed small molecules may be in a gaseous state in the mixing device, resulting in a certain pressure. Because the polyamide has a certain molecular weight, the starting material disperse system formed by the reaction of the polyamide forms a melt with a certain viscosity, and a certain cavity is filled in the mixing device to form a seal, thus avoiding the leakage of the starting materials with low boiling points under pressure, thus being more suitable for the application of screw and tubular reactors. A proportion of the polyamide should not be less than 10%, otherwise it is difficult to adapt to the application of the screw and tubular reactors.

According to the present invention, if the monomer polyamide starting material added is the same as the nylon product, a homopolymer product is obtained; if the monomer polyamide starting material is different from the nylon product, a copolymer product is obtained. The proportion of the polyamide starting material may be adjusted as needed, but should be at least 10% or more. If the polymerization monomer itself is less viscous after melting and the temperature needed for the reaction is relatively high, the proportion of the polyamide in the starting materials is preferably greater than 30%.

As the polymerization reaction is a dehydration reaction, some water in the starting materials may not lead to the complete failure of this method, but the lower the water content in the starting materials is, the easier the amount of each component is controlled; and meanwhile, the energy consumption can be reduced. The polymerization starting materials of the present invention are preferably dry starting materials.

According to the present invention, the starting materials are thrown into the material mixing device at a constant speed to ensure the continuous and stable melt polymerization reaction and feeding.

A rate of the polymerization reaction is related to the temperature. High temperature leads to fast polymerization and high efficiency, but excessively high temperature will cause a series of problems such as yellowing and degradation, so it is necessary to balance a relationship between the reaction temperature and time. According to the present invention, from feeding to discharging, an average residence time of the materials in the material mixing device and the subsequent polymerization device is preferably 10-120 minutes. The residence time of the materials may be estimated by a time when a volume of the mixed materials fills an effective volume of all the mixing and polymerization devices under a certain output. When the materials flow continuously and the output is fixed, the average residence time of the materials in the device is theoretically the same, which can avoid the uneven molecular weight caused by the different residence times of the materials caused by the feeding and discharging sequence in a discontinuous process. When the device is fixed, the time of the polymerization time may be adjusted by adjusting a total feed quantity, so that polymers with different molecular weights can be prepared to meet the needs of different applications. Usually, changing the output of the device can change the time of the polymerization reaction, thus controlling the molecular weight of the product. By controlling feeding proportions of different materials, the composition of a copolymerization unit can be conveniently controlled, thus obtaining products with different physical properties. The same set of devices can achieve the production of products with different performances, which improves the flexibility of production. All adjustments can be completed online, avoiding the wastes caused by downtime due to batch process product switching.

PA66 and PA56 are the most widely used polyamides at present, both of which may be produced by the method of the present invention, and other monomers may be added into the polymerization monomer to adjust the polymer performances, so as to meet wider application requirements.

The present invention has the beneficial effects that:

1. According to the polymerization method for nylon of the present invention, the polyamide is taken as the reactive dispersion medium to melt with the dibasic acid or dibasic acid ester and the diamine monomer to generate the polymerization reaction in the material mixing device. The raw materials are continuously fed into the material mixing device, and the polymerization reaction is completed in the flowing process of material transmission, thus achieving the continuity of feeding, reaction and discharging, overcoming the batch production defect of the traditional reaction vessel process, omitting the step of preparing the nylon salt in the aqueous solution, and avoiding the generation of waste liquids in the process of preparing the nylon salt. The method of the present invention is an environment-friendly nylon polymerization method. The method has the characteristics of high production efficiency, low energy consumption, energy saving and environment-friendly, and is easy to be popularized and applied on a large scale in actual production.

2. The continuous polymerization method for nylon of the present invention avoids the problem of unstable product quality caused by production in batches, and is not affected by factors such as temperature and pH value in the process of preparing the nylon salt in the aqueous solution, and the obtained nylon product has the characteristics of good uniformity and stable quality.

3. According to the present invention, the materials are mixed and dispersed in the screw and tubular reactors. As the screw and tubular reactors have good sealing performances, rapid heat release, and are suitable for diamine with various boiling points, and high material addition efficiency, the present invention overcomes the problems that the conventional molten nylon polymerization is only suitable for diamine with higher boiling points and the addition efficiency is low.

4. The polyamide starting material of the present invention has a wide range of sources, which can be a finished polyamide purchased in the market, or a prepolymer oligomer of the polyamide, which can be conveniently used to prepare polyamide copolymer by mixing different acids or amines, so as to adjust the product performances in a larger range.

5. Due to the addition of the polyamide resin, the disperse system has a certain melting point and viscosity, which can adapt to the application of the screw extruder and the tubular reactor, giving full play to the advantages of high heat transfer and dispersion efficiency of the device, achieving continuous production, and greatly improving the production efficiency.

6. The solubility and melting performance of the aromatic dibasic acid are far worse than those of the aliphatic dibasic acid, so the preparation of the nylon containing aromatic dibasic acid is more difficult than that of the aliphatic nylon. As the method of the present invention makes full use of the dispersion advantages of the polyamide as the disperse system and the advantages of high mixing efficiency of the screw extruder, the method of the present invention is particularly suitable for the preparation of semi-aromatic high-temperature nylon containing aromatic dibasic acid.

7. As the dibasic acid usually has a higher melting point and is more difficult to disperse, so it is preferable to first disperse the dibasic acid into the polyamide to react with the polyamide first, and then add the diamine to ensure the reaction rate and dispersion effect of the polyamide and the monomer. The dibasic acid reacts with the polyamide at high temperature, and the dibasic acid is evenly dispersed into the polymer by chemical bond or physical dispersion to form an intermediate, and then subjected to a polycondensation with the diamine, so that it is unnecessary to prepare the nylon salt in an aqueous or alcohol solution during the synthesis process, which greatly simplifies the polymerization process and avoids the generation of waste liquids during the preparation of the nylon salt. A by-product produced is theoretically only the water generated in the polycondensation process. Therefore, the method of the present invention is an environment-friendly method for synthesizing high-temperature resistant polymers.

8. Because the screw and tubular reactors have good sealing performances and rapid heat release, the dibasic acid ester with a lower boiling point than that of the dibasic acid can also be used to prepare nylon by melt polymerization through the method of the present invention. In addition, as the small molecule alcohol is easier to come out during devolatilization than water when the dibasic acid ester is used as the starting material, the polymerization efficiency is higher than that when the dibasic acid is used as the raw material.

9. When the device is fixed, the time of the polymerization may be adjusted by adjusting the total feed quantity, so that polymers with different molecular weights can be prepared to meet the needs of different applications. Usually, changing the output of the device can change the time of the polymerization, thus controlling the molecular weight of the product. By controlling feeding proportions of different materials, the composition of the copolymerization unit can be conveniently controlled, thus obtaining products with different physical properties. The same set of devices can achieve the production of products with different performances, which improves the flexibility of production. All adjustments can be completed online, avoiding the wastes caused by downtime due to batch process product switching.

EXAMPLES

To make the objects and the technical solutions of the present invention clearer, the present invention is further described in detail hereinafter through related embodiments. The following embodiments are only used to explain the implementation method of the present invention in detail, and do not limit the protection scope of the present invention.

According to the route of the present invention, a nylon salt does not need to be specially prepared in advance, but a molten polyamide is used as a solvent, so that dispersed dibasic acid and diamine directly carry out a salt formation and a polymerization reaction in the polyamide disperse system. Therefore, it is very convenient to prepare nylon copolymer by mixing several dibasic acids or diamines and then feeding, so that product performances can be adjusted in a wider range. It is even possible to add some of polybasic acid or polyamines to the monomer to make the product with a certain degree of cross-linking, thus improving the temperature resistance of the product.

In order to achieve continuous production, a weight metering device or a continuous volume metering device is used in the present invention to ensure stability and continuity of the addition of each component. Some or all of the starting materials may be mixed well in proportion and then metered and added.

The weight metering comprises the use of a weight loss metering device and a liquid pump metering device, and the volume metering comprises the use of a screw metering device and a liquid pump metering device.

Example 1

A continuous polymerization method for nylon, wherein polymerization starting materials comprised, in parts by mass, 5 parts of polymerization monomer dibasic acid and dibasic acid ester, 3 parts of diamine, and 10 parts of reactive dispersion medium polyamide. Polymerization steps comprised: continuously adding the polymerization starting materials into a material mixing device in proportion, so that the starting materials were mixed and reacted in the material mixing device to form a continuously conveyed melt, and reacting the evenly dispersed melt in a subsequent polymerization device until nylon was polymerized to reach a required molecular weight.

Example 2

A continuous polymerization method for nylon, comprising 60 parts of polymerization monomer dibasic acid, 50 parts of diamine and 90 parts of reactive dispersion medium polyamide. Continuously adding the starting materials into a tubular reactor in proportion by means of weight metering or volume metering, so that polymerization monomers were mixed evenly for reaction in a molten reactive amide dispersion medium, and feeding the evenly mixed materials to a subsequent polymerization device until a nylon resin was polymerized to reach a required molecular weight.

A temperature of the material mixing process could satisfy the melting of the polyamide raw material.

A melting point of the dibasic acid starting material was lower than that of the polyamide starting material.

Different polymerization monomers and the molten polyamide starting material were mixed evenly for reaction respectively to form melts first, and then the various melts were continuously added into the material mixing device and mixed evenly.

The polyamide starting material was melted first and then fed to a tubular reactor.

A molar ratio of the diamine to the dibasic acid and dibasic acid ester was 0.4-2.5:1.

Example 3

A continuous polymerization method for nylon, wherein polymerization starting materials comprised, in parts by mass, 50 parts of polymerization monomer dibasic acid ester, 40 parts of diamine, and 10 parts of reactive dispersion medium polyamide. Continuously adding the starting materials into a screw extruder in proportion by means of weight metering or volume metering, so that polymerization monomers were mixed evenly for reaction in a molten reactive amide dispersion medium, and feeding the evenly mixed materials to a subsequent polymerization device until a nylon resin was polymerized to reach a required molecular weight.

The dibasic acid starting material and the molten polyamide starting material were mixed evenly for reaction first, and then the diamine was continuously added into the mixture and mixed evenly for reaction in a material mixing device.

The diamine was melted into a liquid state or dissolved in a solvent, and added into the screw extruder in a liquid state.

A molar ratio of the diamine to the dibasic acid ester was 0.4-2.5:1.

A maximum temperature of the materials reached in the polymerization process was not lower than 250° C.

From feeding to discharging, an average residence time of the materials in the material mixing device and the subsequent polymerization device was 10-120 minutes.

Example 4

A continuous polymerization method for nylon, wherein polymerization starting materials comprised, in parts by mass, 5 parts of polymerization monomer dibasic acid ester, 5 parts of diamine, and 90 parts of reactive dispersion medium polyamide. Continuously adding the starting materials into a screw extruder in proportion by means of weight metering or volume metering, so that polymerization monomers were mixed evenly for reaction in a molten reactive amide dispersion medium, and feeding the evenly mixed materials to a subsequent polymerization device until a nylon resin was polymerized to reach a required molecular weight, and then performing devolatilization, extrusion and granulation by the screw extruder.

The reactive amide dispersion medium was a melt formed by the reaction of the polyamide starting material and the polymerization monomer.

The dibasic acid starting material and the molten polyamide starting material were mixed evenly for reaction first, and then the diamine was continuously added into the mixture and mixed evenly for reaction in a material mixing device.

After the diamine was added, at least one section of the materials flowed upwardly.

A filling rate of at least one section in the device before adding the diamine was 100%

The diamine was added into the screw extruder in a liquid state.

A molar ratio of the diamine to the dibasic acid ester was 0.4-2.5:1.

A maximum temperature of the materials reached in the polymerization process was not lower than 290° C.

From feeding to discharging, an average residence time of the materials in the material mixing device and the subsequent polymerization device was 10-120 minutes.

The dibasic acid starting material contained an aromatic dibasic acid, and a molar ratio of the aromatic dibasic acid accounted for at least 20% of a molar ratio of the dibasic acid starting material.

A moisture content of the starting materials did not exceed 5%.

Example 5

A terephthalic acid and a PA66 resin according to a weight ratio of 18:22, an antioxidant accounting for 0.5% and a catalyst accounting for 0.2% of the total weight were mixed, and then fed into a co-rotating twin-screw extruder from a front end through a weight loss metering device. After the materials were melted, hexamethylene diamine was continuously added into a fifth screw tube, and an amount of the hexamethylene diamine to be added was controlled, so that a molar ratio of the hexamethylene diamine to the terephthalic acid was 1.02:1. A temperature of a subsequent polymerization stage was controlled at 250-320° C., and a total length-to-diameter ratio of screws was 192:1, and the screws were in three-stage series connection. A rear end of the screw extruder was provided with three air vents, and the last two air vents were evacuated. A handpiece temperature was set at 310° C., and a PA6T resin with a melting point of 313° C. and a relative viscosity of 1.7 was obtained by continuous extrusion and granulation. An average residence time of the materials in the polymerization device was about 10 minutes.

Example 6

A terephthalic acid, a PA66 resin and hexamethylene diamine according to a weight ratio of 18:22:12.8, an antioxidant accounting for 0.5% and a catalyst accounting for 0.2% of the total weight were mixed, and then fed into a co-rotating twin-screw extruder from a front end through a weight loss metering device. A temperature near a front end of a screw was 150-260° C., a subsequent polymerization temperature after the materials were evenly mixed was 250-320° C., a total length-to-diameter ratio of the screw was 192:1, three air vents were provided, and the last two air vents were evacuated. A handpiece temperature was set at 310° C., and a PA6T resin with a melting point of 312° C. and a relative viscosity of 1.5 was obtained by continuous extrusion and granulation. An average residence time of the materials in the polymerization device was about 12 minutes.

In this example, the hexamethylene diamine was added to the front end of the screw. As the diamine was easy to loss by volatilization, a hexamethylene diamine ratio of the nylon product obtained was reduced compared with that of Example 5. The product of Example 5 had smooth and even material strips, and the material strips were not broken while discharging from a mouth model, but the product of this example was more difficult to be drawn into strips and granulated than that of Example 5.

Example 7

Solid decamethylene diamine, an phthalic acid and a PA10T resin according to a weight ratio of 17.2:16.6:6, an antioxidant accounting for 0.5% and a catalyst accounting for 0.2% of the total weight were mixed, and then fed into a single-screw extruder from a front end through a weight loss metering device. A screw temperature was set at 100-220° C. in a feeding section of the screw and 250-310° C. in a melting and dispersing section of the screw. After being melted and evenly mixed, the materials were fed into two reaction vessels in turn through a three-way valve link, reacted for 45 minutes at 310° C., then reacted for half an hour in a vacuum of –0.04 MPa, and then subject to screw extrusion and granulation to obtain a PA10T resin with a melting point of 308° C. and a relative viscosity of 2.4. The two reaction vessels took turns to receive the mixed starting materials, respectively polymerized the mixed starting materials, and then took turns to discharge the mixed starting materials to achieve continuous production.

Example 8

P-decyl diamine, a terephthalic acid/terephthalic acid dimethyl ester and a PA10T resin according to a weight ratio of 17.2:18:6, an antioxidant accounting for 0.5% and a catalyst accounting for 0.2% of the total weight were mixed, wherein the molar ratio of the terephthalic acid and the terephthalic acid dimethyl ester was 1:1, and then fed into a single-screw extruder from a feeding section through a weight loss metering device. A screw temperature was set at 100-220° C. in the feeding section of the screw and 250-310° C. in a melting and dispersing section of the screw. After being melted and evenly mixed, the materials were fed into two reaction vessels in turn through a three-way valve link, reacted for 15 minutes at 310° C., then reacted for 15 minutes in a vacuum of –0.041\ Pa, and then subject to screw extrusion and granulation to obtain a PA10T resin with a melting point of 308° C. and a relative viscosity of 2.4. The two reaction vessels took turns to receive the mixed starting materials, respectively polymerized the mixed starting materials, and then took turns to discharge the mixed starting materials to achieve continuous production.

In this example, the terephthalic acid dimethyl ester was used to replace the terephthalic acid for reaction. Compared with Example 7, the same viscosity could be achieved in a shorter reaction time, a reaction speed was faster, and a methanol generated by the reaction was collected and treated.

Example 9

An adipic acid and a PA66 resin according to a weight ratio of 14.6:10, an antioxidant accounting for 0.5% and a catalyst accounting for 0.2% of the total weight were mixed, and then fed into a co-rotating twin-screw extruder from a front end through a weight loss metering device. A screw temperature was set at 150-220° C. in a feeding section of the screw and 220-280° C. in a melting and dispersing section of the screw. After the materials were melted, hexamethylene diamine was continuously fed from the melting and dispersing section, and the added hexamethylene diamine was controlled by weight loss, such that a weight ratio of the hexamethylene diamine to the adipic acid was 11.8:14.6. After the hexamethylene diamine was added from the melting and dispersing section, a temperature of a polymerization section of the screw was set at 220-280° C., a total length-to-diameter ratio of the screw was 192:1, three air vents were provided, and the last two air vents were evacuated. A handpiece temperature was set at 260° C., and a PA66 resin with a melting point of 265° C. and a relative viscosity of 1.8 was obtained by continuous extrusion and granulation. An average residence time of the materials in the polymerization device was about 25 minutes.

Example 10

An adipic acid and a PA66 resin according to a weight ratio of 14.6:10, an antioxidant accounting for 0.5% and a catalyst accounting for 0.2% of the total weight were mixed, and then fed into a co-rotating twin-screw extruder with a length-diameter ratio of 42:1 from a front end through a weight loss metering device. A screw temperature was set at 150-220° C. in a feeding section of the screw and 220-280° C. in a melting and dispersing section of the screw. After the materials were melted, hexamethylene diamine was continuously fed from the melting and dispersing section, and the added hexamethylene diamine was controlled by weight loss, such that a weight ratio of the hexamethylene diamine to the adipic acid was 11.8:14.6. The evenly mixed materials were fed into a continuous flow tubular reactor with an effective volume of 30 liters and equipped with a stirring device through a melt pump, and a temperature was set at 260-280° C. After being discharged out of the tube, the materials were fed to a co-rotating twin-screw extruder with a length-diameter ratio of 32:1, and the temperature was set at 260-280° C., three air vents were provided, and the last two air vents were evacuated. A handpiece temperature was set at 260° C., and a PA66 resin with a melting point of 265° C. and a relative viscosity of 2.2 was obtained by continuous extrusion and granulation. An average residence time of the materials in the polymerization device was about 30 minutes.

Example 11

An adipic acid and a PA66 resin according to a weight ratio of 14.6:10, an antioxidant accounting for 0.5% and a catalyst accounting for 0.2% of the total weight were mixed, and then fed into a co-rotating twin-screw extruder with a length-diameter ratio of 42:1 from a front end through a weight loss metering device. A screw temperature was set at 150-220° C. in a feeding section and 220-280° C. in a melting and dispersing section. After the materials were melted, hexamethylene diamine was continuously fed from the melting and dispersing section, and the added hexamethylene diamine was controlled by weight loss, such that a weight ratio of the hexamethylene diamine to the adipic acid was 11.8:14.6. The evenly mixed materials were fed into a continuous flow tubular reactor with an effective volume of 30 liters and equipped with a stirring device through a melt pump, and a temperature was set at 260-280° C. After being discharged out of the tube, the materials were fed to a co-rotating twin-screw extruder with a length-diameter ratio of 32:1, and the temperature was set at 260-280° C., three air vents were provided, and the last two air vents were evacuated. A handpiece temperature was set at 260° C., and a PA66 resin with a melting point of 265° C. and a relative viscosity of 2.8 was obtained by continuous extrusion and granulation. An average residence time of the materials in the polymerization device was about 40 minutes, which was longer than the residence time of Example 10, and the viscosity of the obtained product was different.

By controlling the reaction time, products with different viscosities could be produced. As long as a flow rate of the device with the same volume was reduced, the reaction time in the device was naturally long.

Example 12

After melting, a PA56 resin was continuously fed into a tubular reactor equipped with a static mixing device, and an adipic acid was continuously added. A ratio of the PA56 resin to the adipic acid was controlled to be 10:14.6 by weight loss, so that the molten PA56 resin and the adipic acid were evenly mixed in the tube, then liquid pentane diamine was continuously added to control a weight ratio of the pentane diamine to the PA56 to be 10.5:5. The materials continuously flowed in the tubular reactor equipped with a static mixing device, and reacted at 250-280° C. for 30 minutes. The continuously flowed-out materials were drained by a screw extruder with a length-diameter ratio of 20:1, and extruded and granulated to obtain a PA56 resin with a melting point of 252° C. and a relative viscosity of 2.2.

Example 13

An adipic acid and a PA56 resin according to a weight ratio of 14.6:10, an antioxidant accounting for 0.5% and a catalyst accounting for 0.2% of the total weight were mixed, and then fed into a co-rotating twin-screw extruder from a front end through a weight loss metering device. A screw temperature was set at 150-220° C. in a feeding section of the screw and 250-280° C. in a melting and dispersing section of the screw. After the materials were melted, pentane diamine was continuously fed from the melting and dispersing section, and the added pentane diamine was controlled by weight loss, such that a weight ratio of the pentane diamine to a p-hexybenzoic acid was 10.5:14.6. The evenly mixed materials were fed into a polymerizing vessel. Two polymerizing vessels were used to feed and discharge the materials in turn, and a vacuumized polymerization time in the polymerizing vessels was 30 minutes. Then the materials were subjected to devolatilization and granulation by a twin-screw extruder with a length-diameter ratio of 30 to obtain the PA56 with a melting point of 255 and a viscosity of 2.5.

Example 14

An adipic acid and a PA56 resin according to a weight ratio of 14.6:10, an antioxidant accounting for 0.5% and a catalyst accounting for 0.2% of the total weight were mixed, and then fed into a co-rotating twin-screw extruder from a front end through a weight loss metering device. A screw temperature was set at 150-220° C. in a feeding section of the screw and 250-280° C. in a melting and dispersing section of the screw. After the materials were melted, pentane diamine was continuously fed from the melting and dispersing section, and the added pentane diamine was controlled by weight loss, such that a weight ratio of the pentane diamine to a p-hexy benzoic acid was 10.5:14.6. After the pentane diamine was added from the melting and dispersing section, a temperature of a polymerization section of the screw was set at 220-275° C., a total length-to-diameter ratio of the screw was 192:1, three air vents were provided, and the last two air vents were evacuated. A handpiece temperature was set at 250° C., and a PA56 resin with a melting point of 252° C. and a relative viscosity of 2.2 was obtained by continuous extrusion and granulation. An average residence time of the materials in the polymerization device was about 25 minutes.

When comparing Examples 12-14, the tubular reactor was used to mix the materials in Example 12, which could easily enlarge the effective volume, thus making the device have a larger production capacity. However, it is necessary to melt the polyamide starting materials first, and use the melt pump to generate a large thrust to push the materials to flow in the tube. The screw extruders were used to mix the materials in Examples 13 and 14, which could use granular nylon starting materials to carry out continuous production directly. However, because the effective volume of the screw extruder is small, in order to ensure the reaction time, a screw with a long length-diameter ratio was needed (in Example 14, the screw extruder had a total length-diameter ratio of 192, which required three-stages in series connection, so that the device occupied a large area on the ground). The reaction vessel was used to prolong the reaction time in Example 13, which could achieve higher viscosity and higher productivity, but made the whole process become a semi-continuous process. Due to the feeding and discharging sequence of the product in the reaction vessel, the time distribution of the materials in the reaction vessel might be wider than that in the continuous device, so that the stability of the product performances was not as good as in Example 14.

Example 15

A PA56 resin in a solid state was continuously fed into a tubular reactor equipped with a static mixing device, and a temperature was set at 300° C. to melt the resin. An adipic acid was continuously added. A ratio of the PA56 resin to the adipic acid was controlled to be 10:14.6 by weight loss, so that the molten PA56 resin and the adipic acid were evenly mixed in the tube, then liquid pentane diamine was continuously added, a weight ratio of the pentane diamine to the PA56 was controlled to be 10.5:5. The materials continuously flowed in the tubular reactor equipped with the static mixing device, and reacted at 250-280° C. for 60 minutes. The continuously flowed-out materials were drained by a screw extruder with a length-diameter ratio of 20:1, and extruded and granulated to obtain a PA56 resin with a melting point of 243° C. and a relative viscosity of 1.6.

The results showed that because the PA56 resin was added in a solid state, a heating efficiency of the static mixing device was limited, which reduced the output by a half and doubled the reaction time, but it was still difficult to achieve the same polymerization effect as that in Example 12. The relative viscosity of Example 12 could reach 2.2, while the relative viscosity of Example 15 could only reach 1.6 in the case that the reaction time was doubled.

Example 16

After melting, a PA56 resin was continuously fed into a tubular reactor equipped with a static mixing device, and a terephthalic acid was continuously added. A ratio of the PA56 resin to the terephthalic acid was controlled to be 10:16.6 by weight loss, so that the molten PA56 resin and the terephthalic acid were evenly mixed in the tube, then liquid pentane diamine was continuously added to control a weight ratio of the pentane diamine to the PA56 to be 10.5:5. The materials continuously flowed in the tubular reactor equipped with the static mixing device, and reacted at 250-300° C. for 30 minutes. The continuously flowed-out materials were drained by a screw extruder with a length-diameter ratio of 20:1, and extruded and granulated.

It was found that the terephthalic acid was difficult to disperse evenly in the static mixing device, and the product materials could not be granulated.

Example 17

P-decamethylene diamine, a sebacic acid and a PA1010 resin according to a weight ratio of 17.2:19.4:6, an antioxidant accounting for 0.5% and a catalyst accounting for 0.2% of the total weight were mixed, and then fed into a co-rotating twin-screw extruder from a front end through a weight loss metering device. A screw temperature was set at 100-180° C. in a feeding section and 180-220° C. in a melting and dispersing section. A total length-to-diameter ratio of the screw was 42:1. After being evenly mixed, the materials were fed into a plug-flow tubular reactor with an effective volume of 30 liters, and then the temperature was set at 200-220° C. After being discharged out of the tube, the materials were fed to a co-rotating twin-screw extruder with a length-diameter ratio of 32:1, and the temperature was set at 200-270° C. A handpiece temperature was set at 200° C., and a PA1010 resin with a melting point of 208° C. and a relative viscosity of 2.4 was obtained. An average residence time of the materials in the polymerization device was about 115 minutes.

Example 18

A PA66 prepolymer prepared in a laboratory, with a carboxyl content of 0.004 mol/g by terminal group analysis, was an polyamide oligomer with carboxyl terminal group.

A p-hexy dibasic acid and the above oligomer PA66 resin were mixed according to a weight ratio of 7:25, and then fed into a co-rotating twin-screw extruder from a front end through a weight loss metering device. After the materials were melted, hexamethylene diamine in liquid state was continuously added from a melting and dispersing section, and the amount of the hexamethylene diamine added was controlled, so that a weight ratio of the hexamethylene diamine to the adipic acid was 9:7. A screw temperature was set at 100-210° C. in a feeding section and 220-280° C. in a melting and dispersing section. A total length-to-diameter ratio of the screw was 42. After being evenly mixed, the materials were continuously fed into a plug-flow tubular reactor with an effective volume of 30 liters for continuous polymerization, and the temperature was set at 220-280° C. Then the materials were extruded and granulated through a co-rotating twin-screw extruder with a length-diameter ratio of 32. The whole set of devices was provided with three air vents, and the last two air vents were evacuated. A PA66 resin with a melting point of 265° C. and a relative viscosity of 2.6 was obtained. An average residence time of the materials in the polymerization device was about 35 minutes.

In this example, as the terminal group of PA66 prepolymer is mainly a carboxyl, the proportion of the dibasic acid in the starting materials was correspondingly reduced, and a molar ratio of the dibasic acid to the diamine was 0.67:1. When the amount of the prepolymer was kept constant at 25 parts and the amount of the adipic acid was reduced to 3.5 parts, the amount of the hexamethylene diamine should be 6 parts. In this case, a molar ratio of the adipic acid to the hexamethylene diamine was about 0.5:1. If the proportion of the adipic acid in the polymerization starting materials was further reduced, the molar ratio of the dibasic acid to the amine was further reduced. If the prepolymer with an amino mainly as the terminal group was selected, the molar ratio of the dibasic acid to the diamine was reversed, and the amount of the acid exceeded the amount of the amine.

In the twin-screw extruder after the hexamethylene diamine was added, at least one section of the screw was arranged to face upwards, and the materials flowed upwardly under the push of the pump, so that the whole section of the screw was tightly filled to form a sealed section to prevent the vaporized hexamethylene diamine from leaking out.

In the twin-screw extruder before the hexamethylene diamine was added, through the combination of screw elements, a filling rate of at least one section was 100%, which ensured that there was at least one sealed section before the diamine was added to prevent the vaporized hexamethylene diamine from leaking from an inlet.

Example 19

Terephthalic acid dimethyl ester and a PA10T resin according to a weight ratio of 19.4:6, an antioxidant accounting for 0.5% and a catalyst accounting for 0.2% of the total weight were mixed, and then fed into a single-screw extruder from a feeding section through a weight loss metering device. A screw temperature was set at 100-220° C. in the feeding section and 250-310° C. in a melting and dispersing section. After the materials were melted and mixed evenly, melted decamethylene diamine was added, and the amount of the decamethylene diamine added was controlled, so that a weight ratio of the decamethylene diamine to the terephthalic acid dimethyl ester was 17:19. After being melted and evenly mixed, the materials were continuously fed into a plug-flow reactor equipped with a stirring device and with an effective volume of 50 liters, and the temperature was set at 280-320° C. Then the materials were extruded and granulated through the screw. A PA10T resin with a melting point of 308° C. and a relative viscosity of 2.2 was obtained. An average residence time of the materials in the polymerization device was about 25 minutes.

Example 20

A terephthalic acid and a PA66 resin according to a weight ratio of 18:22, an antioxidant accounting for 0.5% and a catalyst accounting for 0.2% of the total weight were mixed, and then fed into a co-rotating twin-screw extruder with a length-diameter ratio of 42 from a front end through a weight loss metering device. A screw temperature was set at 150-220° C. in a feeding section and 200-310° C. in a melting and dispersing section. After the materials were melted, hexamethylene diamine was continuously fed from the melting and dispersing section, and the added hexamethylene diamine was controlled by weight loss, such that a molar ratio of the hexamethylene diamine to the terephthalic acid was 1.01:1. The evenly mixed materials were fed into a plug-flow tubular reactor with an effective volume of 30 liters and equipped with a stirring device through a melt pump, and a temperature was set at 280-320° C. After being discharged out of the tube, the materials were fed to a co-rotating twin-screw extruder with a length-diameter ratio of 32:1, the temperature was set at 280-320° C., three air vents were provided, and the last two air vents were evacuated. A handpiece temperature was set at 310° C., and a PA6T/66 resin with a melting point of 316° C. and a relative viscosity of 2.8 was obtained by continuous extrusion and granulation. An average residence time of the materials in the polymerization device was about 25 minutes.

Example 21

A terephthalic acid and a PA6 resin according to a weight ratio of 18:12, an antioxidant accounting for 0.5% and a catalyst accounting for 0.2% of the total weight were mixed, and then fed into a co-rotating twin-screw extruder with a length-diameter ratio of 42 from a front end through a weight loss metering device. A screw temperature was set at 150-220° C. in a feeding section and 200-310° C. in a melting and dispersing section. After the materials were melted, hexamethylene diamine was continuously fed from the melting and dispersing section, and the added hexamethylene diamine was controlled by weight loss, such that a molar ratio of the hexamethylene diamine to the terephthalic acid was 1.01:1. The evenly mixed materials were fed into a plug-flow tubular reactor with an effective volume of 30 liters and equipped with a stirring device through a melt pump, and a temperature was set at 280-305° C. After being discharged out of the tube, the materials were fed to a co-rotating twin-screw extruder with a length-diameter ratio of 32:1, and the temperature was set at 280-305° C., three air vents were provided, and the last two air vents were evacuated. A handpiece temperature was set at 310° C., a PA6T/6 resin with a melting point of 290° C. and a relative viscosity of 2.5 was obtained by continuous extrusion and granulation. An average residence time of the materials in the polymerization device was about 25 minutes.

Example 22

A terephthalic acid and a PA6 resin according to a weight ratio of 18:12, an antioxidant accounting for 0.5% and a catalyst accounting for 0.2% of the total weight were continuously fed into a birotor continuous banburying device, so that the terephthalic acid was evenly dispersed in the PA6 resin. Then, hexamethylene diamine was continuously added from a screw conveying section, and the added hexamethylene diamine was controlled by weight loss, so that a molar ratio of the hexamethylene diamine to the terephthalic acid was 1.01:1. The evenly mixed materials were fed into a plug-flow tubular reactor with an effective volume of 30 liters and equipped with a stirring device through a melt pump, and a temperature was set at 280-305°

C. After being discharged out of the tube, the materials were fed to a co-rotating twin-screw extruder with a length-diameter ratio of 32:1, and the temperature was set at 280-305° C., three air vents were provided, and the last two air vents were evacuated. A handpiece temperature was set at 310° C., a PA6T/6 resin with a melting point of 290° C. and a relative viscosity of 2.6 was obtained by continuous extrusion and granulation. An average residence time of the materials in the polymerization device was about 25 minutes.

Because the continuous banburying device had a better dispersing effect, the continuous banburying device might be applied to a more compact device to achieve the same effects as the screw extruder in Example 21. Relative to Example 21, a diameter of the device in the material mixing stage was reduced by ⅓ in Example 22.

Example 23

A monomer dibasic acid and a PA6T/66 resin according to a weight ratio of 18:12, an antioxidant accounting for 0.5% and a catalyst accounting for 0.2% of the total weight were mixed and fed into a co-rotating twin-screw extruder with a length-diameter ratio of 42 from a front end through a weight loss metering device, wherein the monomer dibasic acid contained an adipic acid to a terephthalic acid with a molar ratio of 8:2. A screw temperature was set at 150-260° C. in a feeding section and 200-310° C. in a melting and dispersing section. After the materials were melted, hexamethylene diamine was continuously fed from the melting and dispersing section, and the added hexamethylene diamine was controlled by weight loss, such that a molar ratio of the hexamethylene diamine to the terephthalic acid was 1.01:1. The evenly mixed materials were fed into a plug-flow tubular reactor with an effective volume of 30 liters and equipped with a stirring device through a melt pump, and a temperature was set at 280-320° C. After being discharged out of the tube, the materials were fed to a co-rotating twin-screw extruder with a length-diameter ratio of 32:1, the temperature was set at 280-320° C., three air vents were provided, and the last two air vents were evacuated. A handpiece temperature was set at 310° C., and a PA6T/66 resin with a melting point of 298° C. and a relative viscosity of 2.7 was obtained by continuous extrusion and granulation. An average residence time of the materials in the polymerization device was about 25 minutes.

Example 24

PA10T and a terephthalic acid were added from a main co-rotating twin-screw extruder according to a ratio of 10:16.6, a temperature of the extruder was set at 250-320° C., and the materials were melted in the first four barrels by using a shearing screw element. PA10T and decamethylene diamine were added from a side-feed screw extruder according to a ratio of 10:17.2, and a temperature of the extruding device was set at 50-320° C. The materials were melted in the side-feed screw extruder by using the shearing screw element, and then fed into the main screw extruder in a fifth section of the main screw extruder. The main screw extruder comprised 10 sections in total. Then, the materials were fed into a continuous flow reactor with an effective volume of 30 liters and equipped with a stirring device, and a temperature was set at 280-320° C. After being discharged out of the tube, the materials were fed to a co-rotating twin-screw extruder with a length-diameter ratio of 32:1, the temperature was set at 280-320° C., three air vents were provided, and the last two air vents were evacuated. A handpiece temperature was set at 310° C., and a PA10T resin with a melting point of 310° C. and a relative viscosity of 2.2 was obtained by continuous extrusion and granulation. An average residence time of the materials in the polymerization device was about 25 minutes.

A finished nylon product prepared by the continuous polymerization process of the present invention has good uniformity, can be discharged by conventional melt conveying and mouth model, has smooth and uniform strips without breaking, and granules after granulating the product are full and evenly mixed, and the continuously produced product has stable performance and high product qualification rate.

According to the preparation method of the present invention, one or more additives such as conventional antioxidant, catalyst, flexibilizer, molecular weight regulator and lubricant used for the synthesis of polyamide can be added as needed, or the polymerization reaction can be directly completed without adding additives. The preparation method is suitable for the synthesis of various polyamide resins, not limited to the types listed in the examples, and has a wide application range.

The above examples only illustrate the specific implementation of the present invention in a more specific and detailed manner, but should not be construed as limiting the patent scope of the present invention. It should be noted that those of ordinary skills in the art may make a plurality of modifications and improvements without departing from the conception of the present invention, and these modifications and improvements shall all fall within the protection scope of the present invention.

What is claimed is:

1. A continuous polymerization method for nylon, wherein polymerization starting materials comprise, in parts by mass, 5-60 parts of polymerization monomer dibasic acid and/or dibasic acid ester, 3-50 parts of diamine, and 10-90 parts of reactive dispersion medium polyamide; and polymerization steps comprise: continuously adding the polymerization starting materials into a material mixing device in proportion, so that the starting materials are mixed and reacted in the material mixing device to form a melt that is continuously conveyed, and reacting the evenly dispersed melt in a subsequent polymerization device until nylon is polymerized to reach a required molecular weight;

wherein the material mixing device is a screw extruder or screw extruders;

wherein the diamine is added into the material mixing device in a liquid state;

wherein the dibasic acid starting material and the molten polyamide starting material are mixed evenly for reaction first, and then the diamine is continuously added and mixed evenly for reaction in the material mixing device;

wherein a filling rate of at least one section in the device before adding the diamine is 100%; and wherein the polyamide accounts for more than 10% of the polymerization starting materials by mass.

2. The continuous polymerization method for nylon according to claim 1, wherein a temperature during the material mixing process is capable of achieving melting of the polyamide starting material.

3. The continuous polymerization method for nylon according to claim 1, wherein the subsequent polymerization device is a device selected from the group consisting of a screw extruder, a tubular reactor, a reaction vessel and combinations thereof.

4. The continuous polymerization method for nylon according to claim 3, wherein the polymerization process comprises devolatilization, extrusion and granulation by a screw extruder or screw extruders.

5. The continuous polymerization method for nylon according to claim 1, wherein after the diamine is added, at least one section of the materials flows upwardly.

6. The continuous polymerization method for nylon according to claim 1, wherein different polymerization monomers are respectively mixed evenly for reaction with the molten polyamide starting material to form melts first, and then the various melts are continuously added into the material mixing device and mixed evenly.

7. The continuous polymerization method for nylon according to claim 1, wherein a molar ratio of the diamine to the dibasic acid and/or dibasic acid ester is 0.4-2.5:1.

8. The continuous polymerization method for nylon according to claim 1, wherein the dibasic acid starting material contains an aromatic dibasic acid, and a molar ratio of the aromatic dibasic acid accounts for no less than 20% of a molar ratio of the dibasic acid starting material.

9. The continuous polymerization method for nylon according to claim 1, wherein a melting point of a polyamide product is higher than 250° C.

10. The continuous polymerization method for nylon according to claim 9, wherein the melting point of the polyamide product is higher than 290° C.

11. The continuous polymerization method for nylon according to claim 1, wherein a maximum temperature reached by the materials during the polymerization process is not lower than 250° C.

12. The continuous polymerization method for nylon according to claim 1, wherein, from feeding to discharging, a total average residence time of the materials in the material mixing device and the subsequent polymerization device is 10-120 minutes.

* * * * *